Dec. 24, 1968   T. KNUTRUD ET AL   3,418,477
APPARATUS FOR DETERMINING THE FOCAL POINT OF A LIGHT BEAM
Filed Sept. 28, 1966   4 Sheets-Sheet 1

INVENTORS.
THORLEIF KNUTRUD
and GLENN H. WISE

BY David M. Kay
AGENT.

INVENTORS.
THORLEIF KNUTRUD
and GLENN H. WISE

BY David M. Keay

AGENT.

INVENTORS.
THORLEIF KNUTRUD
and GLENN H. WISE

BY David M. Keay
AGENT.

INVENTORS.
THORLEIF KNUTRUD
and GLENN H. WISE

BY David M. Kay

AGENT.

3,418,477
APPARATUS FOR DETERMINING THE FOCAL
POINT OF A LIGHT BEAM
Thorleif Knutrud, Sudbury, and Glenn H. Wise, Dover,
Mass., assignors to Sylvania Electric Products Inc., a
corporation of Delaware
Filed Sept. 28, 1966, Ser. No. 582,615
9 Claims. (Cl. 250—201)

This invention relates to optical apparatus, and more particularly it is concerned with apparatus for locating the focal point of a converging beam of light. Further, the invention is concerned with apparatus for controlling the location of the focal point of a converging beam of light.

It is often necessary to determine the location of the real focal point of a converging beam of light such as that produced by either a concave mirror, or a convex lens. The focal point location may be required for a variety of reasons, for example, to determine various characteristics of a lens, a mirror, or an entire optical system, or to bring into focus the image of an optical system. The location of the focal point is defined by the focal length of the focusing element. If monochromatic light of two different wavelengths is applied to the focusing element to form a pair of converging beams of light, the axial distance between their focal points is the amount of chromatic aberration of the focusing element.

However, if the converging beam of light is moving, the problem of locating the focal point becomes more difficult and it may be impossible to determine the location accurately by visual observation. For example, in laser technology, it is often desirable to record the information contained on the laser beam on photographic film. To record this information factually on film, it is necessary to have the laser beam accurately focused on the film surface while the laser beam is continually scanning across the film at high frequency. It is not possible to adjust the focus of this beam manually during the recording of data due to the scanning speed necessary to give good definition to the trace record over a wide bandwidth. There is, however, a continuous requirement for accurate focusing of the light beam during operation since the components of the system are subject to deflections caused by thermal expansion and the accumulation of mechanical tolerances necessary to build an operable scanning system.

Accordingly, it is an object of the present invention to provide improved apparatus for locating the focal point of a converging beam of light.

Another object of the invention is to provide an automatic focus control system capable of operating over a wide range of scanning frequencies.

Briefly, in accordance with the invention, apparatus for locating the focal point of a converging beam of light includes a pair of opaque members each of which has an optically sharp edge, the optically sharp edges being arranged to form a slit. Apparatus is provided for sweeping the converging beam of light across the slit. The two optically sharp edges are spaced apart along the axis of the converging beam of light when the beam is aligned symmetrically between the two optically sharp edges. In addition, the two optically sharp edges are spaced apart in the direction of scan of the scanning light beam. Means are provided for detecting the time required for the intensity of the light passing through the slit as the converging beam sweeps across the slit to reach a maximum intensity and the time required for the intensity of the light to return from a maximum to zero as the beam passes the second optically sharp edge.

As the converging beam of light passes the first optically sharp edge, the detection means senses an increasing amount of light entering the slit. This intensity increases until either the beam is symmetrically located between the optically sharp edges or the full width of the beam is entering the slit. As the beam passes over the second optically sharp edge, the amount of light entering the slit decreases until the full width of the beam passes the second optically sharp edge. Because the converging beam of light is of conical form the time required for the light intensity to reach a maximum and the time required to decay to zero are functions of the location of the focal point of the converging beam of light. Therefore, the location of the focal point can readily and accurately be determined. Once determined, the location of the focal point of the converging beam of light can be adjusted to another desired position.

Other objects, advantages, and features of the invention will be apparent from the following more detailed description and the accompanying drawings, wherein.

Figure 1:
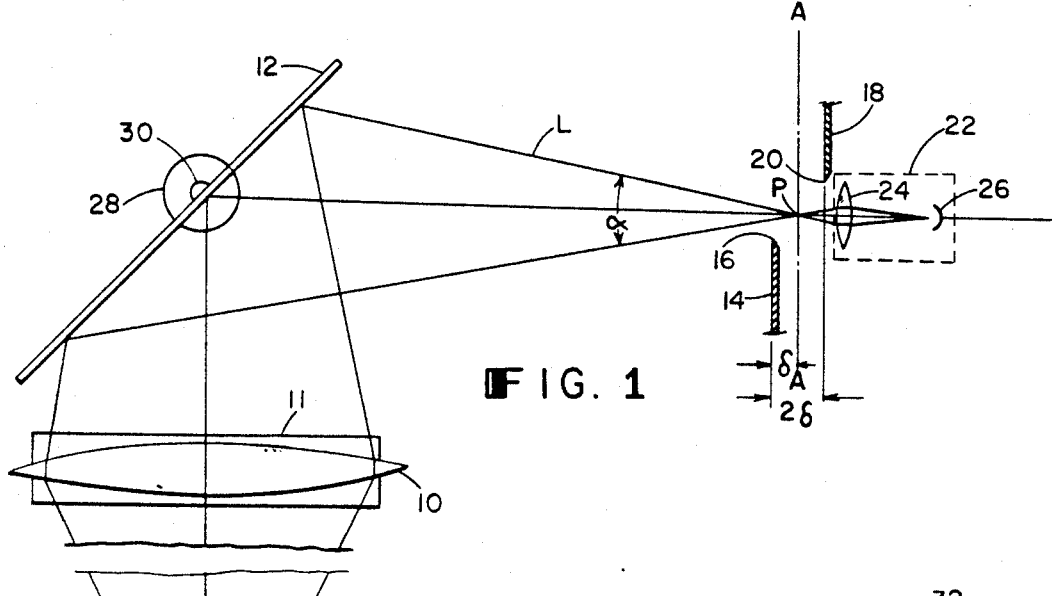
FIG. 1 is a schematic representation, partially in block diagram form, of apparatus for determining the focal point of a converging beam of light according to the invention.

Referring to FIG. 1, there is shown a first embodiment of the invention wherein a system is depicted for locating the focal point of a converging beam of light. This apparatus is also useful for providing automatic quality control inspection of certain characteristics of focusing elements such as lenses or mirrors. The focusing element 10 to be inspected, in this case a lens, is installed as the final element in an optical system by placement in a support 11. A point source of monochromatic light S emits the light energy which is focused by the focusing element 10 into a converging beam of light L which may be described as a cone of angle α where α is determined by the focusing element. The cone of light L is reflected by a moveable mirror 12 which is located in the path of the converging beam of light. A reference plane A—A is located at a distance from the support 11 so that the beam of light L will have its focal point P incident on the reference plane A—A if the focal length of the focusing element 10 is correct.

There is shown a first opaque member 14 which has an optically sharp edge 16 and a second opaque member 18 which also has an optically sharp edge 20. The opaque members 14 and 18 are arranged so that the two optically sharp edges 16 and 20, hereinafter referred to as knife edges, define a slit. The first knife edge 16 is located a distance δ in front of a reference plane A—A and the second knife edge 20 is located an equal distance δ behind the reference plane A—A.

A detecting system 22 is positioned behind the slit defined by the knife edges 16 and 20 to provide an indication of the intensity of the light passing through the slit at a given time. In this embodiment, the detection system 22 includes a collecting lens 24 and a photodetector 26. The collecting lens 24 is positioned so that all of the light passing between the knife edges 16 and 20 is imaged onto the photodetector 26.

The moveable mirror 12 causes the converging beam of light L to scan across the slit, the width of which extends perpendicular to the axis of the converging beam of light and in the direction of scan of the scanning light beam. As shown schematically in FIG. 1, the scanning movement of the beam is accomplished by an oscillating or rotating means 28 which is connected to the mirror 12 by shaft 30. As the light beam is scanned across the slit, the intensity detected by the photodetector 26 varies. The electronic output signal of the photodetector 26 is processed by electronic locator circuitry 32 which determines the location of the focal point P of the converging beam of light L. The output of the electronic locator circuitry 32 is fed to a readout device 34 which provides the operator with information concerning the acceptability of the focusing element 10 under inspection. This readout may be either visual or audio or may be used to direct additional apparatus to automatically accept or reject the focusing element 10.

Figure 2A:
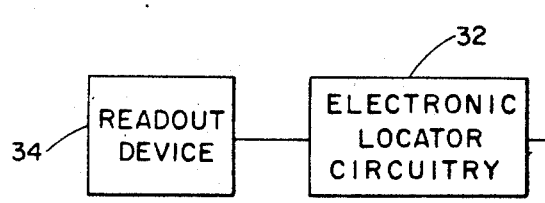
FIG. 2A is a diagram of the slit showing an out-of-focus converging beam of light passing through the slit.

Referring to FIG. 2A, there is shown a converging beam of light which focuses at point P. The width of the cone of the converging beam of light at the first knife edge 16 is designated as $W_1$, and at the second knife edge 20 as $W_2$. When the scanning motion of the converging beam of light L, as provided by the rotating mirror 12 in FIG. 1, is upward relative to the slit, a scan of the light cone L is produced across the slit. As the cone crosses the first knife edge 16, the photodetector 26 produces a signal with a rise time $T_1 = W_1/V_1$, where $V_1$ is the scan velocity at the first knife edge 16. Later, as the light cone L scans across the second knife edge 20, the detector 26 produces a signal which decays with a fall time $T_2 = W_2/V_2$, where $V_2$ is the scan velocity at the second knife edge 20.

Figure 2B:
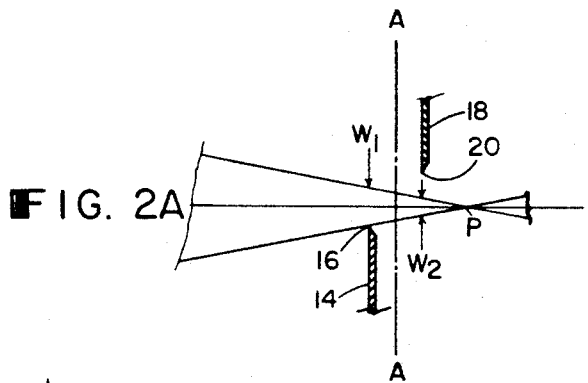
FIG. 2B is a graphical representation of the intensity of the light detected in the case shown in FIG. 2A.

The graphical representation of the signal produced by the photodetector 26 is shown in FIG. 2B as curve 36. As can be seen, $T_1$, associated with the passing of the light cone across the first knife edge 16, is much longer than $T_2$, the time associated with the crossing of the light cone over the second knife edge 20. The larger value of $T_1$ with respect to $T_2$ corresponds with the relative widths of the light cone at the first knife edge 16 and at the second knife edge 20.

In order for the signal produced by the photodetector 26 to reach a true maximum, the separation of the edges of the knife edges perpendicular to the axial direction of the converging beam of light should be greater than the larger of $W_1$ or $W_2$ so that all the energy in the light cone may be incident on the photodetector 26 at the midpoint of the crossing. As the width of the slit decreases beyond the larger of $W_1$ or $W_2$, a decreasing degree of accuracy of the system results.

The knife edges 16 and 20, as depicted in FIGS. 4, 1, 2A, and 3A are parallel and straight, and lie in planes perpendicular to the axis of the converging beam of light when the axis is symmetrically aligned between the knife edges. It is not necessary that these conditions exist in order for the apparatus to function; however, if any do not exist, then the differences must be compensated for in the associated electronics.

Figure 3A:
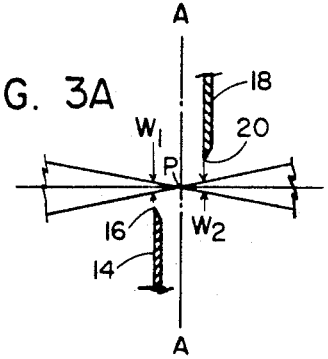
FIG. 3A is a diagram of the slit showing an in-focus converging beam of light passing through the slit.
Figure 3B:
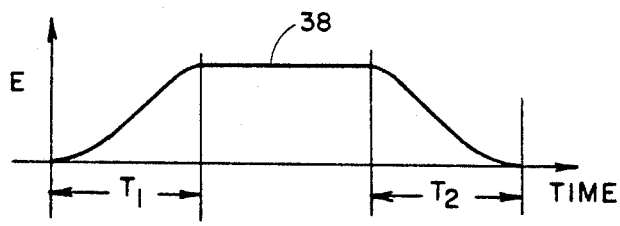
FIG. 3B is a graphical representation of the intensity of the light detected in the case shown in FIG. 3A.

Referring now to FIG. 3A, the light cone is shown focused on the reference plane A—A which is midway between the knife edges 16 and 20. Curve 38 of FIG. 3B shows the rise time $T_1$ and the fall time $T_2$ to be equal, corresponding to the equivalence of dimensions $W_1$ and $W_2$.

The electronic locator circuitry 32 in FIG. 1 processes the signals significant of times $T_1$ and $T_2$ to provide an indication of the location of the focal point P of the converging beam of light L. The sign of $T_1-T_2$ determines the direction of displacement of the focal point P from the reference plane A—A. If the sign is positive, $T_1$ being larger than $T_2$, then the focal point P is located on the side of the reference plane away from the light source. Conversely if $T_2$ is larger than $T_1$, $T_1-T_2$ having a negative sign, then the focal point P is located between the reference plane and light source. $T_1$ is a measure of the distance of the focal point P from the first knife edge 16 and $T_2$ is a measure of the distance of focal point P from the second knife edge 20. Thus the signals significant of the times $T_1$ and $T_2$ provide the information by which the electronic locator circuitry 32 produces an indication of the focal point of the converging beam of light for transmission to the readout device 34.

In addition, the apparatus shown in FIG. 1 may be used to inspect lenses for chromatic aberration by changing the source of light S from one monochromatic source to another monochromatic source and examining for changes in the location of the focal point P.

Figure 4:
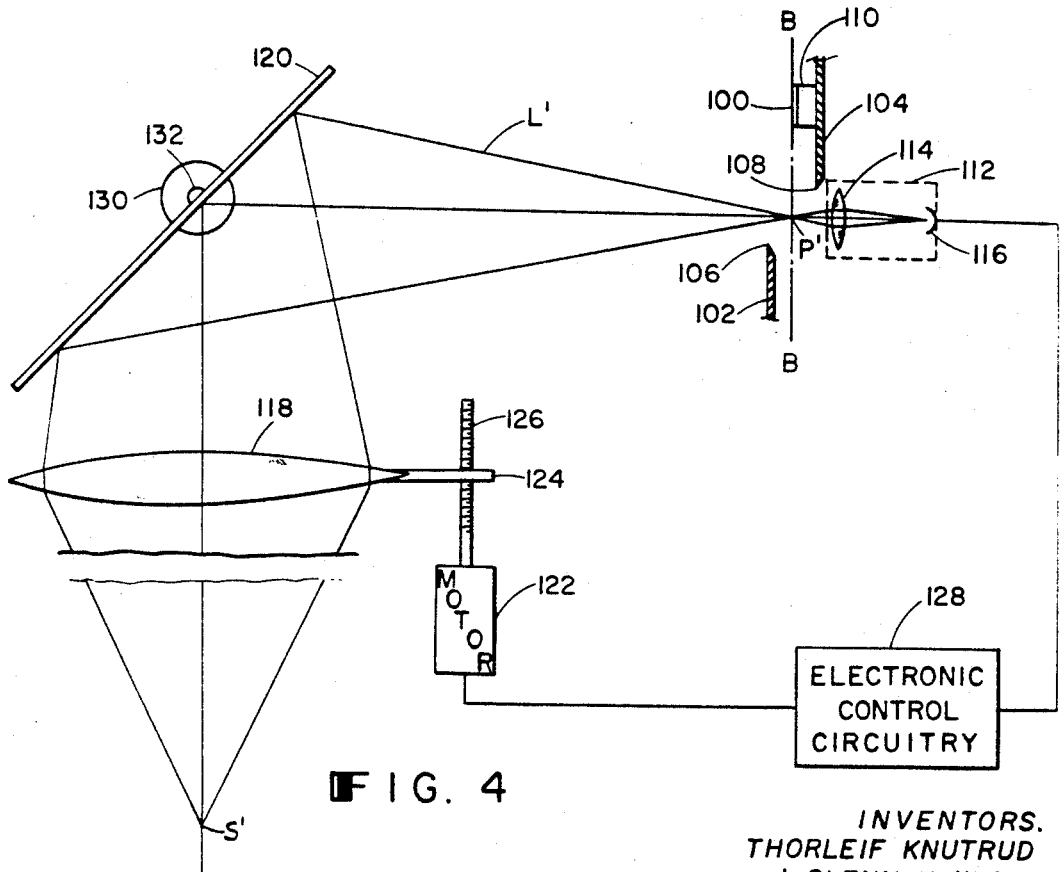
FIG. 4 is a schematic representation, partially in block diagram form, of an automatic focus control system according to the invention.

Referring to FIG. 4, there is shown a second embodiment of the invention which is an automatic focus control system. The purpose of the apparatus shown is to focus the light generated at source S', generally a point source, on a surface 100 which represents the location of a film, photocathode, reticle or other detector, or element. The surface 100 lies in a reference plane B—B. In addition, there is shown a pair of opaque members 102 and 104 each of which has a knife edge, 106 and 108 respectively. The two opaque members are arranged as in the embodiment of FIG. 1 so that the knife edges 106 and 108 form a slit. The reference plane B—B is located midway between the knife edges 106 and 108. The surface 100 is shown as being secured to support structure 110 so as to be in fixed relationship with opaque member 104.

In this embodiment the detection system 112 includes a collecting lens 114 and a photodetector 116. The collecting lens 114 is positioned so that all light passing between the knife edges 106 and 108 is imaged onto the photodetector 116.

As shown in FIG. 4, the converging beam of light L' is focused at point P' which is coincident with the reference plane B—B midway between the knife edges 106 and 108. The location of the reference plane B—B may be in any constant spatial relationship with respect to the knife edges 106 and 108 as will be explained hereinafter. This positioning of the focal point of the converging beam of light is accomplished by a focusing lens 118 which focuses the emitted light from the source S' into a converging beam L' which is reflected by a mirror 120 into the slit. The location of the focal point P' along the axis of the converging beam of light is adjusted by movement of lens 118 accomplished by a motor 122 through a lead screw 126 and a support 124 for the lens. Control of the motor 122 for positioning of the lens is provided by electronic control circuitry system 128 in response to the output signal of the photodetector 116. The mirror 120 scans the converging beam of light across the slit and the surface 100. This scanning is provided by an oscillating or rotating means 130 which is shown connected to the mirror 120 via a shaft 132.

The electronic control circuitry is used to derive an error signal proportional to the difference $(T_1-T_2)$ between the time required for the intensity of the light passing through the slit to rise from zero to a maximum $(T_1)$ and the time required for the intensity to decay from the maximum to zero $(T_2)$. The phase and amplitude of this difference error signal may then be used to position a moveable element in the optical system such as the support 124 on the lead screw 126 in FIG. 4. This motion displaces P' axially until $T_1$ equals $T_2$ $(T_1-T_2=0)$, and a balanced condition is reached in which $W_1$ equals $W_2$.

Figure 5:
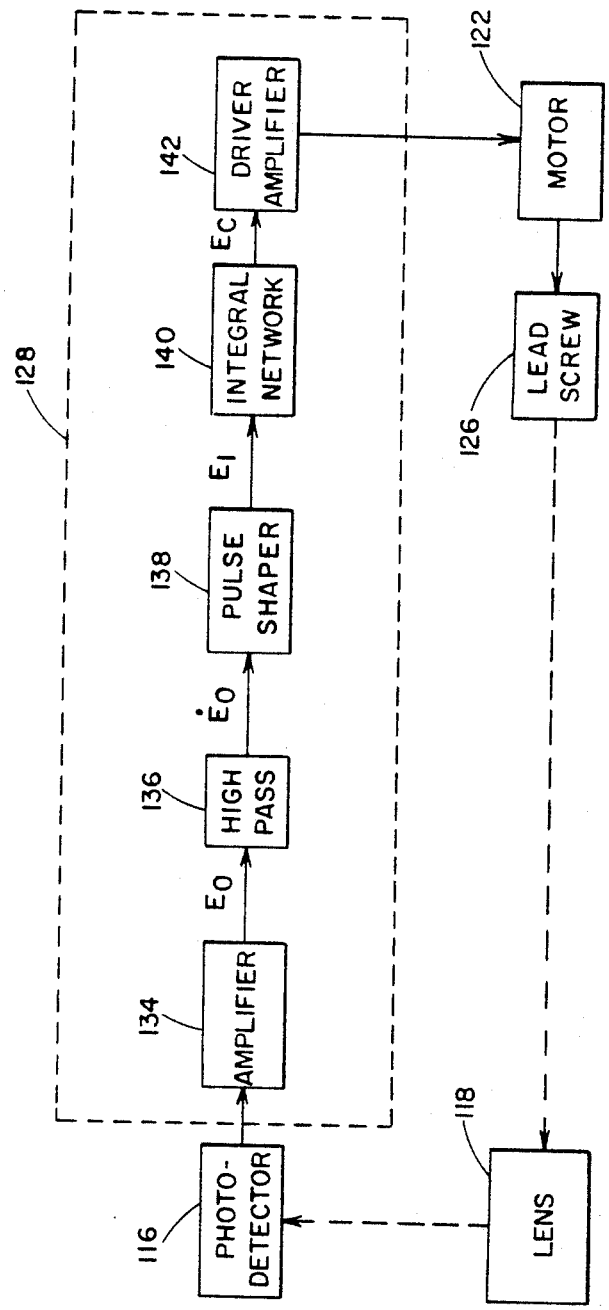
FIG. 5 is a block diagram of typical electronic feedback apparatus as employed in the focus control system of FIG. 4 to properly refocus the light beam.
Figure 6:
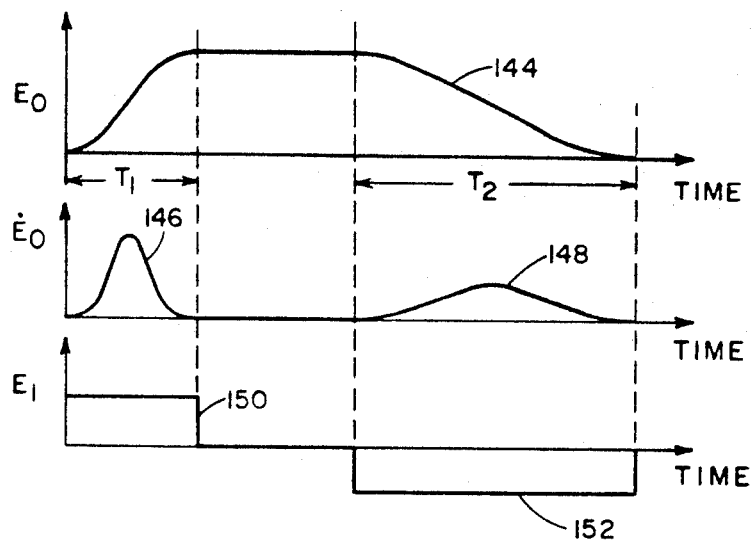
FIG. 6 is a graphical representation of wave forms generated by the apparatus of FIG. 5.

A typical electronic control system which utilizes the output of the photodetector 26 to maintain the focus of the optical system shown in FIG. 4 is shown in block diagram form in FIG. 5. FIG. 6 is a compilation of the wave forms occurring at various stages of this electronic control system. It will be noted that the motor 122 is used to position an element of the opitical system such as the lens 118 by means of the lead screw 126. However, any other such means for repositioning either an element of the optical system or the slit and detection system is also suitable. An amplifier 134 following the photodetector 116 produces a voltage $E_0$ with the wave form 144 shown in FIG. 6 when the optical system is defocused. A simple RC high pass filter 136 is used to derive a voltage approximately equal to the derivative of $E_0$, thus giving the voltage $\dot{E}_0$ shown in FIG. 6.

The error in the position of the focus is proportional to the difference $(T_1-T_2)$ in the rise and fall time of $E_0$. This difference is approximately equal to the difference between the duration of the two $\dot{E}_0$ pluses 146 and 148. A signal proportional to the time difference can be derived by first shaping the pulses in a pulse shaper 138 which gives two pulses 150 and 152 in FIG. 6 of equal magnitude, and these pulses are then integrated in an integral network 140 for an average error voltage $E_C$. $E_C$ is then amplified in a driver amplifier 142. By proper phasing of $E_C$, this error voltage is then used to drive the motor 122 to reposition the lens 118 by means of the lead screw 126 to a position equalizing the rise and fall times of $E_0$, thus focusing the optics half-way between the knife edges 106 and 108.

The reference plan B—B is not, however, limited to the position shown in FIG. 4, but may be placed in any constant relationship to the knife edges 106 and 108 by addition to the control voltage $E_C$ of an appropriate bias voltage.

It can, therefore, be readily seen that an automatic focus control system is provided for use where a light beam is scanned across a reference surface. The automatic focus control system is limited in accuracy only by the physical dimensions and quality of the equipment employed and the intensity of the focused beam of light. The scanning frequency is limited only by the frequency response of the ancillary electronics. The system is of simple mechanical construction and may be totally independent of operator control. In addition, any technique for scanning the focused light beam across the slit, such as a rotating or oscillating prism, can be employed. Also, the slit can be moved relative to the focused light beam to accomplish a scanning effect.

While there has been shown and described what are considered to be preferred embodiments of the present invention, it will be obvious to those skilled in the art that various changes and modifications may be made therein without departing from the invention as defined in the appended claims.

What is claimed is:

1. Apparatus for locating the focal point of a converging beam of light comprising
   a first opaque member having a first optically sharp edge,
   a second opaque member having a second optically sharp edge,
   the first and second opaque members being arranged so that the first and second optically sharp edges define a slit,
   scanning means for causing the converging beam of light to scan across the slit,
   the first optically sharp edge being located a first distance from the second optically sharp edge along the axis of the light beam and a second distance from the second optically sharp edge in the direction of scan of the scanning light beam, and
   detecting means for detecting the time required for the intensity of the light passing between the first and second optically sharp edges to rise from zero to a maximum and the time required for the intensity of the light beam to decay from its maximum to zero.

2. Apparatus for locating the focal point of a converging beam of light according to claim 1 in which said first and second optically sharp edges lie in parallel planes which are perpendicular to the axis of the converging beam of light when said converging beam is directed midway between the first and second optically sharp edges.

3. Apparatus for locating the focal point of a converging beam of light according to claim 2 in which
   said first and second optically sharp edges are parallel and straight, and
   said scanning means for causing the converging beam of light to scan across the slit comprises
      a mirror to reflect the converging beam of light, and
      means for moving the mirror so that the converging beam of light is scanned across the slit.

4. Apparatus for the inspection of focusing elements which form light from a point source of light into a converging beam of light comprising
   a point source of light for providing light for a focusing element to be inspected to form into a converging beam of light,
   a support for holding and locating the focusing element to be inspected,
   a first opaque member having a first optically sharp edge,
   a second opaque member having a second optically sharp edge,
   the first and second opaque members being arranged so that the first and second optically sharp edges define a slit,
   a mirror located in the path of the converging beam of light to reflect the converging beam of light,
   the first opaque member being located a first distance from the support along the axis of the converging beam of light,
   means for moving the mirror so that the converging beam of light is scanned across the slit,
   the first optically sharp edge being located a second distance from the second optically sharp edge along the axis of the converging beam of light and a third distance from the second optically sharp edge in the direction of scan of the scanning light beam,
   the third distance between the first optically sharp edge and the second optically sharp edge being greater than the width of the scanning converging beam of light as measured at either optically sharp edge in the direction of scan of the scanning light beam,
   light detecting means for detecting and producing an indication of the intensity of the light passing between the first and second optically sharp edges,
   time responsive means operative in response to the indication of the light intensity to detect and to produce indications of the time required for the intensity to rise from zero to a maximum and the time required for the intensity to decay from its maximum to zero, and
   readout means operative in response to the time indications to produce an indication of the relative location of the focal point of the converging beam of light with respect to the support for the focusing element to be inspected.

5. An automatic focus control system comprising
   a source of light,
   focusing means for focusing light from the source into a converging beam,
   a reference plane on which the beam is to be focused,
   a first opaque member having a first optically sharp edge,
   a second opaque member having a second optically sharp edge,
   the first and second opaque members being arranged so that the first and second optically sharp edges define a slit,
   means for causing the beam of light to scan across the reference plane and across the slit,
   the first optically sharp edge being located a first distance from the second optically sharp edge along the axis of the light beam and a second distance from the second optically sharp edge in the direction of scan of the scanning light beam, light detecting means for detecting and producing an indication of the intensity of the light passing between the first and second optically sharp edges, time responsive means operative in response to the indication of the light intensity to detect and to produce indications of the time required for the intensity to rise from zero to a maximum and the time required for the intensity to decay from its maximum to zero, readout means operative in response to the time indications to produce an indication of the relative location of the focal point of the converging light beam with respect to the reference plane, and feedback means operative in response to the indication of the relative position of the focal point of the converging beam of light and the reference plane to adjust the relative position of the focal point of the converging light beam and the reference plane to focus the converging light beam on the reference plane.

6. An automatic focus control system according to claim 5 in which said means for causing the converging light beam to scan across the reference plane and across the slit comprises a mirror to reflect the converging beam of light and means for moving the mirror so that the converging beam of light is scanned across the slit, and in which said first and second optically sharp edges lie in parallel planes which are perpendicular to the axis of said converging beam of light when said converging beam is directed midway between the first and second optically sharp edges.

7. An automatic focus control system according to claim 6 in which said source of light is a point source of light, and said means for moving the mirror comprises means for moving the mirror so that the converging beam of light repeatedly is scanned across the slit.

8. An automatic focus control system according to claim 7 in which said first and second optically sharp edges are parallel and straight, said focusing means for focusing the light into a converging beam comprises a focusing lens, and said light detecting means for detecting and producing an indication of the intensity of the light passing between the first and second optically sharp edges comprises a photodetector operative to produce an electronic signal proportional to the instantaneous amount of light incident upon it, and means for imaging said light passing between said first and second optically sharp edges onto the photodetector.

9. An automatic focus control system according to claim 8 in which said second distance between said first optically sharp edge and said second optically sharp edge is greater than the width of the scanning converging beam of light as measured at either optically sharp edge when the focal point of the converging beam of light lies in the reference plane, said means for imaging said light passing between said first and second optically sharp edges onto the photodetector comprises a lens, said reference plane is located midway between the first and second optically sharp edges and is perpendicular to the axis of the converging beam of light when the converging beam of light is directed midway between the first and second optically sharp edges, said means for moving the mirror comprises means for causing the mirror to rotate at a particular frequency, said feedback means comprises a motor, and mechanical means coupling the motor to the focusing lens, said time responsive means operative in response to the indication of the light intensity to detect and produce indications of the time required for the intensity to rise from zero to a maximum and the time required for the intensity to decay from its maximum to zero and said readout means operative in response to the time indications to produce an indication of the relative location of the focal point of the converging light beam with respect to the reference plane comprise a first amplifying means operative to produce a gain in the electronic signal produced by the photodetector, means operative in response to the amplified photodetector signal to produce a voltage signal equal to the time derivative of said voltage signal, means for shaping the time derivative signal to produce voltage pulses of equal magnitude, means for producing an error signal from the equal magnitude pulses, and a second amplifying means operative in response to said error signal to drive said motor, whereby the motor causes the focusing lens to be moved so that the focal point of the converging beam of light is moved into the reference plane.

References Cited
UNITED STATES PATENTS

| | | | |
|---|---|---|---|
| 2,922,351 | 1/1960 | Hering | 250—234 X |
| 2,975,285 | 3/1961 | Palmer | 88—56 X |
| 3,041,459 | 6/1962 | Greene | 250—201 |

JAMES W. LAWRENCE, *Primary Examiner.*

E. R. LA ROCHE, *Assistant Examiner.*

U.S. Cl. X.R.

250—234; 88—1, 56